United States Patent
Kwon et al.

(10) Patent No.: US 10,260,601 B1
(45) Date of Patent: Apr. 16, 2019

(54) MULTI STAGE TRANSMISSION FOR VEHICLE

(71) Applicants: HYUNDAI MOTOR COMPANY, Seoul (KR); KIA Motors Corporation, Seoul (KR)

(72) Inventors: Hyun Sik Kwon, Seoul (KR); Seong Wook Ji, Gunpo-si (KR); Ki Tae Kim, Incheon (KR); Ju Hyeon Park, Suwon-si (KR); Il Han Yoo, Hwasun-eup (KR); Seong Wook Hwang, Gunpo-si (KR); Won Min Cho, Hwaseong-si (KR)

(73) Assignees: HYUNDAI MOTOR COMPANY, Seoul (KR); KIA Motors Corporation, Seoul (KR)

( * ) Notice: Subject to any disclaimer, the term of this patent is extended or adjusted under 35 U.S.C. 154(b) by 12 days.

(21) Appl. No.: 15/827,188

(22) Filed: Nov. 30, 2017

(30) Foreign Application Priority Data

Sep. 28, 2017 (KR) .................. 10-2017-0125748

(51) Int. Cl.
*F16H 3/66* (2006.01)
*F16H 3/44* (2006.01)

(52) U.S. Cl.
CPC ......... *F16H 3/66* (2013.01); *F16H 2003/445* (2013.01); *F16H 2200/0069* (2013.01); *F16H 2200/2012* (2013.01); *F16H 2200/2046* (2013.01)

(58) Field of Classification Search
CPC ........ F16H 3/44; F16H 3/66; F16H 2003/005; F16H 2200/2012; F16H 2200/2041; F16H 2200/2046; F16H 2037/047; F16H 2037/048

See application file for complete search history.

(56) References Cited

U.S. PATENT DOCUMENTS

| 9,587,714 | B2 | 3/2017 | Kook et al. | |
| 2015/0133259 | A1* | 5/2015 | Nakamura | F16H 3/66 475/275 |
| 2016/0201766 | A1* | 7/2016 | Kato | F16H 3/66 475/275 |

* cited by examiner

*Primary Examiner* — Mark J Beauchaine
(74) *Attorney, Agent, or Firm* — McDonnell Boehnen Hulbert & Berghoff LLP

(57) ABSTRACT

Disclosed herein is a multi-stage transmission for a vehicle. The multi-stage transmission includes an input shaft IN and an output shaft OUT; a first planetary gear set PG1, a second planetary gear set PG2, a third planetary gear set PG3, and a fourth planetary gear set PG4 installed between the input shaft IN and the output shaft OUT so as to transfer a torque and each including three rotary elements; and six shifting elements connected to the rotary elements of the first to fourth planetary gear sets.

4 Claims, 2 Drawing Sheets

FIG. 2

| GEAR STAGE | CL1 | CL2 | B1 | B2 | CL3 | CL4 | GEAR RATIO |
|---|---|---|---|---|---|---|---|
| 1ST |  | ● | ● |  | ● |  | 6.402 |
| 2ND |  | ● | ● | ● |  |  | 4.807 |
| 3RD |  | ● |  | ● | ● |  | 3.462 |
| 4TH |  | ● |  | ● |  | ● | 1.962 |
| 5TH | ● | ● |  | ● |  |  | 1.385 |
| 6TH | ● |  |  | ● |  | ● | 1.252 |
| 7TH | ● |  |  |  | ● | ● | 1.000 |
| 8TH | ● |  |  | ● | ● |  | 0.907 |
| 9TH | ● |  | ● |  | ● |  | 0.796 |
| 10TH | ● |  | ● | ● |  |  | 0.598 |
| REV |  | ● | ● |  |  | ● | −5.360 |

MULTI STAGE TRANSMISSION FOR VEHICLE

CROSS REFERENCE TO RELATED APPLICATION

The present application claims priority to Korean Patent Application No. 10-2017-0125748, filed on Sep. 28, 2017, the entire contents of which is incorporated herein by reference.

BACKGROUND OF THE DISCLOSURE

1. Technical Field

The present disclosure relates to a multi-stage transmission for a vehicle, and more particularly, to a technology capable of improving fuel efficiency of a vehicle by implementing a multi shift stage of ten forward stages and one rearward stage.

2. Description of the Related Art

Recently, a rise in oil prices has motivated automobile manufacturers throughout the world to compete with respect to improvements in fuel efficiency. Further, efforts have been made to improve engine fuel efficiency and decrease engine weight through technology such as downsizing.

Meanwhile, as to improving fuel efficiency of a vehicle transmission, there is a method of allowing an engine to be driven at a more efficient driving point through a multi-stage transmission to ultimately improve fuel efficiency.

In addition, the multi-stage transmission as described above may allow the engine to be driven in a relatively low revolution per minute (RPM) band to further improve the noise level generated by the vehicle.

However, as shift stages of the transmission are increased, the number of internal components configuring the transmission is also increased. As a result, there may be difficulty in loading the transmission into the engine compartment and the transfer efficiency of the transmission may be deteriorated while cost and weight may be increased. Therefore, in order to maximize fuel efficiency through the multi-stage transmission, it is important to devise a transmission structure capable of deriving maximum efficiency using a small number of components and a relatively straightforward configuration.

The contents described as the related art have been provided only for assisting in the understanding for the background of the present disclosure and should not be considered as corresponding to the related art known to those skilled in the art.

SUMMARY OF THE DISCLOSURE

One aspect of the present disclosure is to provide a multi-stage transmission for a vehicle capable of maximizing fuel efficiency of the vehicle through driving an engine at an optimal driving point and improving the noise level generated by the vehicle through a more quiet operation of the engine by implementing in the engine ten forward stages and one rearward stage with a relatively small number of components and a straightforward configuration.

According to an exemplary embodiment of the present disclosure, there is provided a multi-stage transmission for a vehicle, including: an input shaft IN to which power of an engine is transferred; an output shaft OUT outputting the power; a first planetary gear set PG1, a second planetary gear set PG2, a third planetary gear set PG3, and a fourth planetary gear set PG4, each having three rotary elements; a first rotary shaft RS1 connected to the input shaft IN; a second rotary shaft RS2 connected to a second rotary element of the first planetary gear set PG1 and a third rotary element of the second planetary gear set PG2; a third rotary shaft RS3 connected to a first rotary element of the third planetary gear set PG3; a fourth rotary shaft RS4 connected to a first rotary element of the first planetary gear set PG1, a first rotary element of the second planetary gear set PG2, and a third rotary element of the third planetary gear set PG3; a fifth rotary shaft RS5 connected to a second rotary element of the second planetary gear set PG2; a sixth rotary shaft RS6 connected to a third rotary element of the first planetary gear set PG1, a second rotary element of the third planetary gear set PG3, and a third rotary element of the fourth planetary gear set PG4; a seventh rotary shaft RS7 connected to a first rotary element of the fourth planetary gear set PG4; and an eighth rotary shaft RS8 connected to a second rotary element of the fourth planetary gear set PG4 and the output shaft OUT.

The multi-stage transmission may further include: four clutches that interconnect two rotary shafts among eight rotary shafts; and two brakes for selectively connecting a rotary shaft of the eight rotary shafts that is not connected to the input shaft IN or the output shaft OUT and a transmission housing CS.

The four clutches may include a first clutch CL1 installed between the first rotary shaft RS1 and the second rotary shaft RS2; a second clutch CL2 installed between the first rotary shaft RS1 and the second rotary shaft RS2; a third clutch CL3 installed between the fourth rotary shaft RS4 and the seventh rotary shaft RS7; and a fourth clutch CL4 installed between the fourth rotary shaft RS4 and the eighth rotary shaft RS8, and the two brakes may include a first brake B1 installed between the fifth rotary shaft RS5 and the transmission case CS; and a second brake B2 installed between the seventh rotary shaft RS7 and the transmission case CS.

The first, second and third rotary elements of the first planetary gear set PG1 may be configured of a first sun gear, a first carrier, and a first ring gear. The first, second, third rotary elements of the second planetary gear set PG2 may be configured of a second sun gear, a second carrier, and a second ring gear. The first, second and third rotary elements of the third planetary gear set PG3 may be configured of a third sun gear, a third carrier, and a third ring gear. The first, second and third rotary elements of the fourth planetary gear set PG4 may be configured of a fourth sun gear, a fourth carrier, and a fourth ring gear.

BRIEF DESCRIPTION OF THE DRAWINGS

FIG. 2 is an operation mode table describing that each shift stage is implemented by the transmission of FIG. 1.

DESCRIPTION OF THE DISCLOSURE

Figure 1:
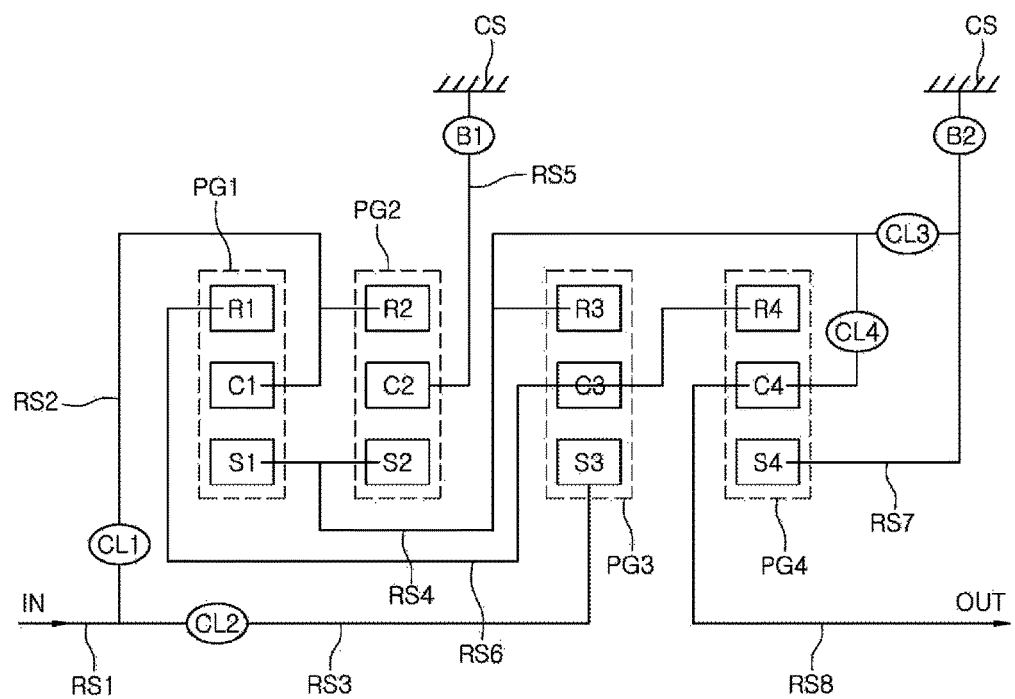
FIG. 1 is a configuration diagram of a multi-stage transmission for a vehicle according to an exemplary embodiment of the present disclosure.

Referring to FIG. 1, a multi-stage transmission for a vehicle according to an exemplary embodiment of the present disclosure is configured to include an input shaft IN and an output shaft OUT; a first planetary gear set PG1, a second planetary gear set PG2, a third planetary gear set PG3, and a fourth planetary gear set PG4 installed between the input shaft IN and the output shaft OUT so as to transfer a torque and each including three rotary elements; and six shifting elements connected to the rotary elements of the first to fourth planetary gear sets.

In particular, the multi-stage transmission for a vehicle includes: a first rotary shaft RS1 connected to the input shaft IN; a second rotary shaft RS2 connected to a second rotary element C1 of the first planetary gear set PG1 and a third rotary element R2 of the second planetary gear set PG2; a third rotary shaft RS3 connected to a first rotary element S3 of the third planetary gear set PG3; a fourth rotary shaft RS4 connected to a first rotary element S1 of the first planetary gear set PG1, a first rotary element S2 of the second planetary gear set PG2, and a third rotary element R3 of the third planetary gear set PG3; a fifth rotary shaft RS5 connected to a second rotary element C2 of the second planetary gear set PG2; a sixth rotary shaft RS6 connected to a third rotary element R1 of the first planetary gear set PG1, a second rotary element C3 of the third planetary gear set PG3, and a third rotary element R4 of the fourth planetary gear set PG4; a seventh rotary shaft RS7 connected to a first rotary element S4 of the fourth planetary gear set PG4; and an eighth rotary shaft RS8 connected to a second rotary element C4 of the fourth planetary gear set PG4 and the output shaft OUT.

The first planetary gear set PG1, the second planetary gear set PG2, the third planetary gear set PG3, and the fourth planetary gear set PG4 are sequentially disposed in an axial direction from the input shaft IN toward the output shaft OUT.

The transmission elements include: four clutches that interconnect two rotary shafts among eight rotary shafts; and two brakes for selectively connecting a rotary shaft not connected to the input shaft IN or the output shaft OUT among the eight rotary shafts and the transmission housing CS.

Specifically, the four clutches include a first clutch CL1 installed between the first rotary shaft RS1 and the second rotary shaft RS2; a second clutch CL2 installed between the first rotary shaft RS1 and the third rotary shaft RS3; a third clutch CL3 installed between the fourth rotary shaft RS4 and the seventh rotary shaft RS7; and a fourth clutch CL4 installed between the fourth rotary shaft RS4 and the eighth rotary shaft RS8.

The two brakes include a first brake B1 installed between the fifth rotary shaft RS5 and the transmission case CS; and a second brake B2 installed between the seventh rotary shaft RS7 and the transmission case CS.

That is, the second rotary element C2 of the second planetary gear set PG2 may be connected to the transmission case CS by the first brake B1 to be controlled in a fixed state or a freely rotatable state. The first rotary element S4 of the fourth planetary gear set PG4 may be connected to the transmission case CS by the second brake B2 to be controlled in a fixed state or a freely rotatable state.

The first brake B1 and the second brake B2, the first clutch CL1, the second clutch CL2, the third clutch CL3, and the fourth clutch CL4 are all controlled by a controller (not illustrated) according to the operation mode table as illustrated in FIG. 2, so that a total of ten forward stages and one rearward stage of the vehicle are available.

The first brake B1, the second brake B2, the first clutch CL1, the second clutch CL2, the third clutch CL3, and the fourth clutch CL4 are collectively referred to as a "shifting element." In particular, the transmission of the present disclosure is configured to realize a so-called clutch-to-clutch shift, which performs shifting by engaging another shifting element while releasing one shifting element upon a series of shifting from first stage to tenth stage, as illustrated in FIG. 2.

The first, second and third rotary elements of the first planetary gear set PG1 are configured of a first sun gear, a first carrier, and a first ring gear. The first, second, and third rotary elements of the second planetary gear set PG2 are configured of a second sun gear, a second carrier, and a second ring gear. The first, second and third rotary elements of the third planetary gear set PG3 are configured of a third sun gear, a third carrier, and a third ring gear. The first, second and third rotary elements of the fourth planetary gear set PG4 are configured of a fourth sun gear, a fourth carrier, and a fourth ring gear.

As described above, the multi-stage transmission of the present disclosure configured with four simple planetary gear sets and six shifting elements may implement ten forward stages and one rearward stage according to the operation mode table, as illustrated in FIG. 2. Thus, the multi shift stage of ten stages may be realized with a relatively small number of components, a straightforward configuration, and a low weight. As a result, it is possible to improve the fuel efficiency of the vehicle by providing a more optimized shifting ratio to the driving condition of the vehicle.

As set forth above, according to an exemplary embodiment of the present disclosure, ten forward stages and one rearward stage are implemented by a relatively small number of components and a straightforward configuration, thereby maximizing fuel efficiency of the vehicle by driving the engine at an optimal driving point and improving the noise level generated by the vehicle by a more quiet operation of the engine.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A multi-stage transmission for a vehicle, comprising:
an input shaft to which power of an engine is transferred;
an output shaft outputting the power;
a first planetary gear set, a second planetary gear set, a third planetary gear set, and a fourth planetary gear set, each having three rotary elements;
a first rotary shaft connected to the input shaft;
a second rotary shaft connected to a second rotary element of the first planetary gear set and a third rotary element of the second planetary gear set;
a third rotary shaft connected to a first rotary element of the third planetary gear set;
a fourth rotary shaft connected to a first rotary element of the first planetary gear set, a first rotary element of the second planetary gear set, and a third rotary element of the third planetary gear set;
a fifth rotary shaft connected to a second rotary element of the second planetary gear set;
a sixth rotary shaft connected to a third rotary element of the first planetary gear set, a second rotary element of the third planetary gear set, and a third rotary element of the fourth planetary gear set;
a seventh rotary shaft connected to a first rotary element of the fourth planetary gear set; and
an eighth rotary shaft connected to a second rotary element of the fourth planetary gear set and the output shaft.

2. The multi-stage transmission of claim 1, further comprising:
  four clutches that interconnect two rotary shafts among the eight rotary shafts; and
  two brakes for selectively connecting a rotary shaft of the eight rotary shafts that is not connected to the input shaft or the output shaft and a transmission housing.

3. The multi-stage transmission of claim 2, wherein the four clutches include a first clutch installed between the first rotary shaft and the second rotary shaft; a second clutch installed between the first rotary shaft and the third rotary shaft; a third clutch installed between the fourth rotary shaft and the seventh rotary shaft; and a fourth clutch installed between the fourth rotary shaft and the eighth rotary shaft, and
  the two brakes include a first brake installed between the fifth rotary shaft and the transmission case and a second brake installed between the seventh rotary shaft and the transmission case.

4. The multi-stage transmission of claim 1, wherein the first, second and third rotary elements of the first planetary gear set are configured of a first sun gear, a first carrier, and a first ring gear;
  the first, second, third rotary elements of the second planetary gear set are configured of a second sun gear, a second carrier, and a second ring gear;
  the first, second and third rotary elements of the third planetary gear set are configured of a third sun gear, a third carrier, and a third ring gear, and
  the first, second and third rotary elements of the fourth planetary gear set are configured of a fourth sun gear, a fourth carrier, and a fourth ring gear.

* * * * *